United States Patent [19]

Miyamoto

[11] Patent Number: 5,452,346

[45] Date of Patent: Sep. 19, 1995

[54] TELEPHONE APPARATUS WITH CALLER IDENTIFICATION

[75] Inventor: Hiroshi Miyamoto, Chiba, Japan

[73] Assignee: Sony Corporation, Tokyo, Japan

[21] Appl. No.: 233,452

[22] Filed: Apr. 26, 1994

[30] Foreign Application Priority Data

May 14, 1993 [JP] Japan .................................. 5-136560

[51] Int. Cl.$^6$ ..................... H04M 15/00; H04M 1/56; H04M 3/00; H04M 1/66
[52] U.S. Cl. ..................................... 379/142; 379/127; 379/188; 379/189; 379/199; 379/200; 379/245
[58] Field of Search ................ 379/127, 142, 188, 189, 379/199, 200, 245

[56] References Cited

U.S. PATENT DOCUMENTS

| | | | |
|---|---|---|---|
| 4,817,133 | 3/1989 | Takahashi | 379/142 |
| 4,924,496 | 5/1990 | Figa | 379/199 |
| 4,937,854 | 6/1990 | Sarakas | 379/188 |
| 5,134,653 | 7/1992 | Satomi | 379/142 |
| 5,220,599 | 6/1993 | Sasano | 379/142 |
| 5,265,145 | 11/1993 | Lim | 379/142 |
| 5,267,307 | 11/1993 | Izumi | 379/142 |
| 5,283,818 | 2/1994 | Klausner | 379/142 |

Primary Examiner—Stephen Chin
Assistant Examiner—Vijay Shankar
Attorney, Agent, or Firm—Jay H. Maioli

[57] ABSTRACT

A telephone apparatus including a decoder, a memory, a comparison circuit and an output device. The decoder serves to detect and decode telephone number information of a calling side transmitted with bell signals through a telephone line. The memory stores telephone number data of calling sides in correspondence with operation keys. When a call is received, the comparison circuit compares the output data of the decoder with the telephone number data stored in the memory. If a coincidence is detected between the output data of the decoder and the telephone number data of the memory based on the comparison result of the comparison circuit, the output device notifies a user that the call corresponds to one of the telephone number data stored in the memory. The output device includes indication units provided in correspondence with a plurality of operation keys, and a driving control circuit for selectively activating the indication unit of the operation key corresponding to the coincident telephone number data. Alternately, the output device may include audio data memory in which names of call sides are stored as audio data in correspondence with both the telephone number data stored in the memory and the operation keys, a speaker to which the audio data read out from the audio data memory are supplied, and a controller for reading out the audio data corresponding to the coincident telephone number data from the audio data memory and outputting the correct audio data.

19 Claims, 8 Drawing Sheets

TELEPHONE APPARATUS WITH CALLER IDENTIFICATION

BACKGROUND

1. Field of the Invention

The present invention relates to a telephone apparatus. More particularly the present invention relates to a telephone apparatus having a function of supplying a reception (called) side with information on a calling (transmitting) side such as telephone number information.

2. Background of the Invention

Figure 1A:
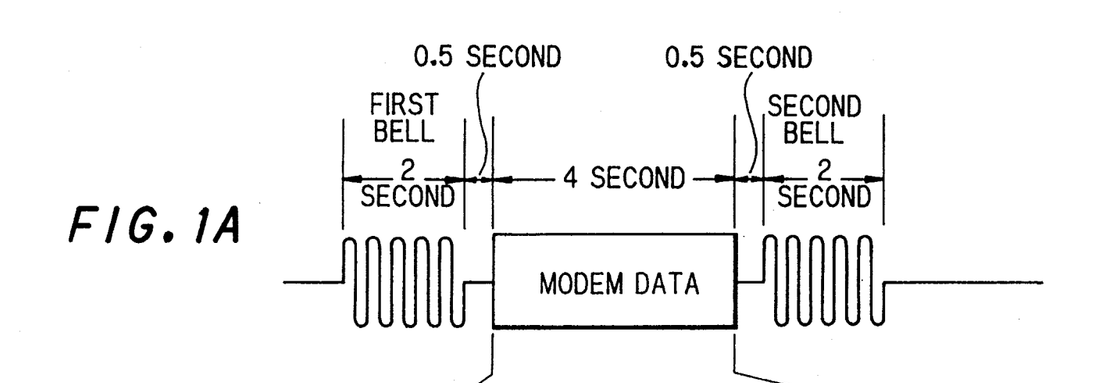
FIGS. 1A and 1B are diagrams showing a time chart and a format of the reception bell signals transmitted to the reception side.
Figure 1B:
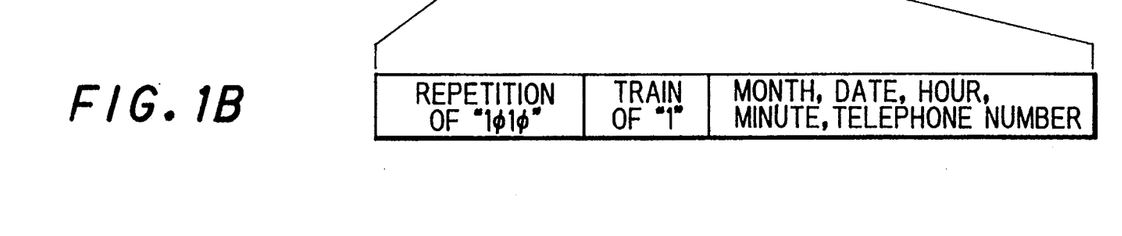

A telephone service which is called "Call Display" for inserting the telephone number of a calling (transmitting) side between bell signals for reception of a call and transmitting the data to a reception (called) side has widely propagated in the U.S. A and Canada. FIGS. 1A and 1B are diagrams showing a time chart and a format of the reception bell signals transmitted to the reception side.

In this Call Display telephone service, modem data containing information on the telephone number of a calling side is inserted between first and second bell signals as shown in FIG. 1A. A bell signal is used to ring a bell of a telephone at the reception side, and it includes, for example, a 20 Hz signal which is continuous for two seconds (corresponding to one bell sound). The modem data having data length corresponding to four seconds is inserted after 0.5 second elapses subsequently to a first bell signal. Further, a second bell signal is located so as to be continuous for two seconds after 0.5 second elapses subsequently to the modem data. Subsequently, the similar bell signals, each of which is continuous for two seconds, are intermittently transmitted at a time interval of 5 seconds until an user at the reception side answers the call. The modem data is inserted only between the first and second bell signals.

In this case, as shown in FIG. 1B, the modem data includes a synchronizing signal consisting of a repetition of "1", "0" which are alternately repeated over 240 bits at the head of the modem data, and subsequently a signal having a train of "1" (mark) each continuing for 25 msec over 150 msec. This signal is used to identify the head of the data. The modem data finally includes information on month, date, hour, minute and telephone number. This information on month, date, hour, minute and telephone number are respectively set with 144 bits in the U.S.A., and with about 250 bits in Canada. For these modem data, biphase marks codes (mark="1"=2200 Hz, space ="0"=1200 Hz are transmitted at 1200 baud. This is defined as a Bell 202 standard.

According to this telephone service, by decoding the modem data located between the first and second bell signals, the telephone number of a calling side can be detected before a reception side receives and answers the phone from the calling side. In a conventional telephone apparatus, the telephone number of the calling side which is obtained by decoding the modem data as described above is displayed on a display unit such as an LCD (Liquid Crystal Display). Except for a case where the telephone number of the calling side is well known by the user, it is common that the user cannot immediately identify a calling side on the basis of the telephone number of the calling side even when the telephone number is displayed on the display unit.

Accordingly, in addition to the Call Display telephone service, some companies have conducted a service which is called "Name Display".

According to the Name Display telephone service, the name of a telephone subscriber is transmitted together with information on the telephone number thereof between the reception bell signals. However, in order to perform the Name Display telephone service, loads such as installation of a new switchboard, etc. must be imposed on a telephone office side, and thus this service has hardly propagated.

A technique for enabling the display of names of calling sides using only the Call Display telephone service has been previously proposed in U.S. Pat. No. 4,924,496, for example.

According to this technique, a telephone apparatus is equipped with a dictionary memory in which the telephone numbers of calling sides and the corresponding names of the calling sides can be registered. In this telephone apparatus, transmitted information on a telephone number is decoded on the basis of the Call Display telephone service to compare the telephone number data with each of the registered telephone numbers read out from the dictionary memory, and if any telephone number is coincident with the transmitted telephone number data, the name data of the coincident telephone number is read out and displayed on a display unit such as an LCD.

However, in the technique as described above, an user is required to prepare beforehand a dictionary memory containing name data corresponding the telephone numbers of calling sides. That is, it is necessary that the user manually inputs these names and registers the names in correspondence with the telephone numbers. This task is very formidable and imposes a large burden on the user, and thus this telephone apparatus is inconvenient for the user.

Further, this telephone service must use a display unit having an alphabetical-letter displaying function, and it is expensive.

SUMMARY OF THE INVENTION

It is, therefore, an object of the present invention to provide a telephone apparatus which solves the above-mentioned problem.

According to the present invention, there is provided a telephone apparatus including a decoder, a memory, a comparison circuit and an output device. The decoder serves to detect information concerning the telephone number of a calling side which is transmitted together with bell signals through a telephone line to decode the information of the telephone number. The memory serves to store data relating to the telephone numbers of calling sides in correspondence with plural selection keys. The comparison circuit serves to compare the output data from the data from the decoder (i.e., the decoded information of the telephone number transmitted through the telephone line) with the telephone number data stored in the memory when a call is received through a telephone line (at a reception time). The output device serves to inform the reception side that the reception corresponds to the telephone number data which have been already stored in the memory when the comparison result of the comparison circuit represents coincidence between the data on the telephone numbers stored in the memory and the output data from the decoder.

According to the present invention, there is provided a telephone apparatus including a decoder, a memory, an name-writing area, a display device, a comparison circuit and a driving circuit. The decoder serves to detect information on the telephone number of a calling side which is transmitted through a telephone line to decode the information on the telephone number. The memory serves to store the telephone number data of calling sides in correspondence with plural selection keys. The name-writing area is an area in which the names of the calling sides corresponding to the telephone number data stored in the memory can be written in accordance with the keys. The display device serves to indicate the name portion of the calling sides which is written in the name-writing area. The comparison circuit serves to read out the telephone number data from the memory when a call is received through a telephone line and information on the telephone number of a calling side is detected, and compare the read-out telephone number data with the output data of the decoder. When the comparison circuit detects that the same telephone number data as decoded by the decoder exists in the telephone number data stored in the memory, the driving circuit serves to drive the display device to indicate the name portion of the calling side in the name-writing area which corresponds to the detected telephone number data.

According to the present invention, there is provided a telephone apparatus including a decoder, a memory, a recording and reproducing unit, a speaker unit, a comparison circuit and a controller. The decoder serves to detect information on the telephone number of a calling side which is transmitted through a telephone line to decode the information on the telephone number. The memory serves to store the telephone number data of calling sides in correspondence with the key selection of plural keys. The recording and reproducing unit serves to record and reproduce as audio data the names of calling sides corresponding to telephone number data which are stored in the memory in correspondence with plural selection keys. The speaker unit is supplied with the audio data outputted from the recording and reproducing unit. The comparison circuit serves to read out the telephone number data from the memory when a call is received through a telephone line and information on the telephone number of a calling side is detected, and compare the read-out telephone number data with the output data of the decoder. When the comparison circuit detects that the same telephone number data as decoded by the decoder exists in the telephone number data stored in the memory, the controller serves to drive the speaker unit to reproduce and output the audio data corresponding to the detected telephone number data from the recording and reproducing unit.

According to the present invention, there is provided a telephone apparatus including a decoder, first and second memories, a name-writing area, a display device, a comparison and coincidence circuit and a driving circuit. The decoder serves to detect information on the telephone number of a calling side which is transmitted together with a reception bell sound through a telephone line to decode the information on the telephone number. The first memory serves to store the telephone number data decoded by the decoder. The second memory serves to store the telephone numbers of calling sides in correspondence with plural manipulation keys. The name-writing area is an area in which the names of the calling sides corresponding to the telephone number data stored in the second memory can be written in accordance with the key manipulation. The display device serves to indicate the name portion of the calling sides written in the name-writing area. The comparison and coincidence circuit serves to reads out the telephone number data from the first memory and the telephone number from the second memory when receiving a search instruction, and compares these read-out telephone number data to detect whether any coincident telephone number data exists. When any coincidence telephone number data is detected by the comparison and coincidence circuit, the driving circuit drives the display device to indicate the name portion of the calling side in the name-writing area, which corresponds to the detected telephone number data.

According to the present invention, there is provided a telephone apparatus including a decoder, first and second memories, a recording and reproducing unit, a speaker unit, a comparison and coincidence circuit and a controller. The decoder serves to detect information on the telephone number of a calling side which is transmitted through a telephone line to decode the information on the telephone number. The first memory serves to store the telephone number data decoded by the decoder. The second memory serves to store the telephone numbers of calling sides in correspondence with plural manipulation keys. The recording and reproducing unit serves to record and reproduce as audio data the names of calling sides corresponding to telephone number data which are stored in the memory in correspondence with plural manipulation keys. The speaker unit is supplied with the audio data outputted from the recording and reproducing unit. The comparison circuit serves to read out the telephone number data from the memory when a call is received through a telephone line and information on the telephone number of a calling side is detected, and compare the read-out telephone number data with the output data of the decoder. When the comparison circuit detects that the same telephone number data as decoded by the decoder exists in the telephone number data stored in the memory, the controller serves to drive the speaker unit to reproduce and output the audio data corresponding to the detected telephone number data from the recording and reproducing unit.

According to the present invention, there is provided a telephone number including a decoder, a memory, display units, a comparison circuit and a controller. The decoder serves to detect information on the telephone number of a calling side which is transmitted together with bell signals through a telephone line to decode the telephone number data. The memory serves to store data on the telephone numbers of calling sides in correspondence with plural selection keys. The display units are provided in correspondence with the respective selection keys. The comparison circuit serves to compare the output data of the decoder (the decoded data on the telephone number transmitted through the telephone line) with the information on the telephone numbers stored in the memory when a call is received. When the comparison result of the comparison circuit represents coincidence between one of the telephone number data stored in the memory and the output data of the decoder, the controller selectively drives the display unit of the selection key corresponding to the coincident telephone number data.

According to the present invention, there is provided a telephone apparatus including a decoder, a memory, first and second display units, a comparison circuit and a controller. The decoder serves to detect information on the telephone number of a calling side which is transmitted together with bell signals through a telephone line to decode the telephone number data. The memory serves to store data on the telephone numbers of calling sides in correspondence with plural selection keys. The first display units are provided in correspondence with the respective selection keys. The second display unit serves to display the data decoded by the decoder. The comparison circuit serves to compare the output data of the decoder (the decoded data on the telephone number transmitted through the telephone line) with the information on the telephone numbers stored in the memory when a call is received. When the comparison result of the comparison circuit represents coincidence between one of the telephone number data stored in the memory and the output data of the decoder, the controller selectively drives the first display unit of the selection key corresponding to the coincident telephone number data. On the other hand, when the comparison result of the comparison circuit represents that no telephone number data which is coincident with the output data of the decoder exists in the memory, the controller drives the first and second display units so that the telephone number data of the calling side which is decoded by the decoder is not displayed on any first display unit.

According to this invention, the telephone numbers which have been stored in the memory in correspondence with the selection keys are compared with the received telephone number, and if any coincident telephone number is detected, the display unit corresponding to the selection key for the coincident telephone number is turned on, whereby an user can easily identify the calling side. Further, the same effect can be obtained by reading out and outputting the name data which have been previously stored in the memory in correspondence with calling sides when any coincident telephone number is found.

BRIEF DESCRIPTION OF THE DRAWINGS

The invention will be more readily understood with reference to the accompanying drawing wherein.

DESCRIPTION OF THE INVENTION

Preferred embodiments according to the present invention will be hereunder described with reference to the accompanying drawings.

Figure 2:
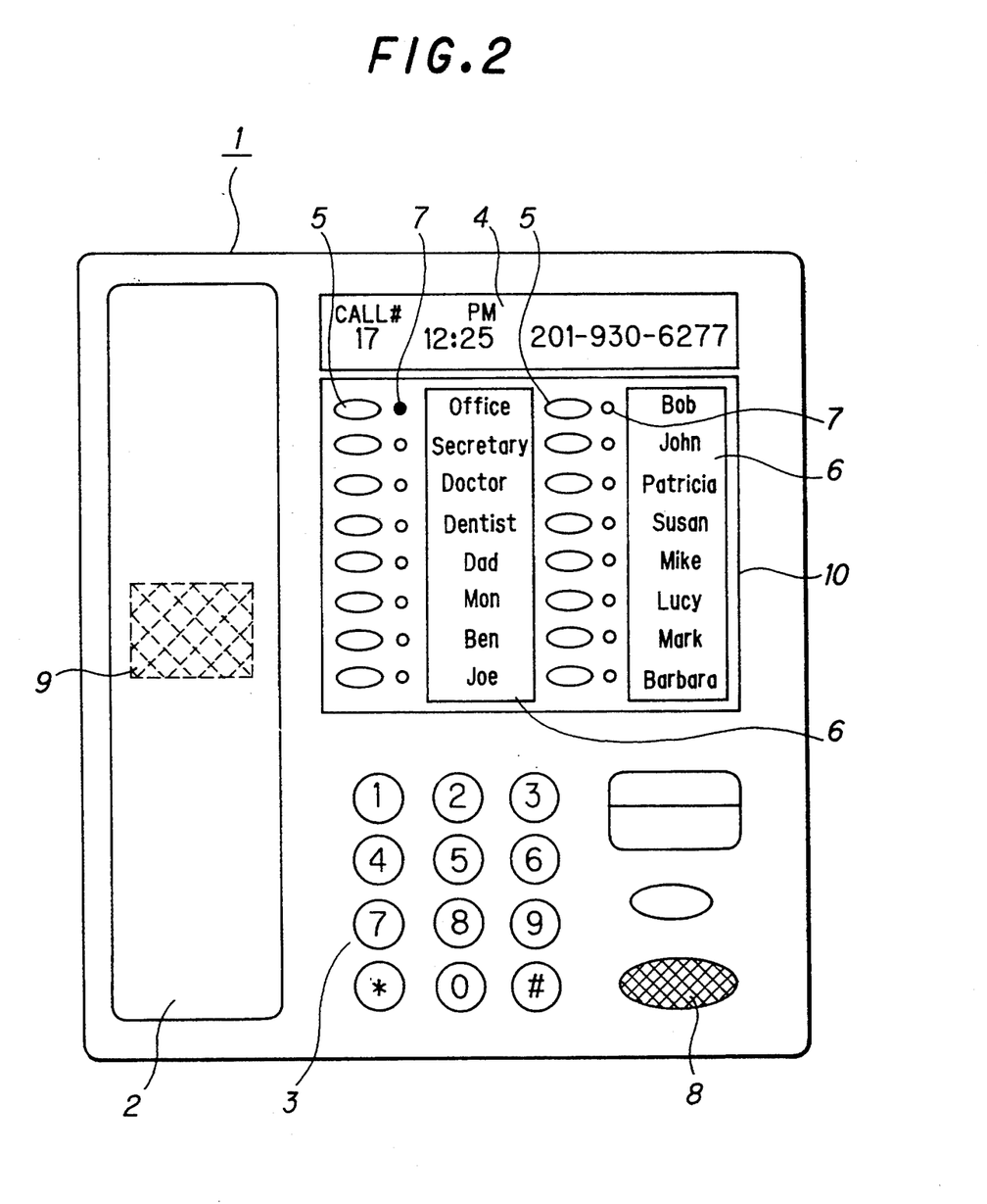
FIG. 2 shows an outline of an operation panel of a first embodiment of a telephone apparatus according to this invention.

FIG. 2 shows the outline of an embodiment of the telephone apparatus according to this invention. In FIG. 2, reference numeral 1 represents a main body of the telephone apparatus, reference numeral 2 represents a hand set, reference numeral 3 represents a numeric key for inputting a telephone number, and reference numeral 4 represents a display unit for displaying the input telephone number, a time, etc. The display unit 4 is composed of an LCD, for example. Reference numeral 10 represents a one-touch operation portion, and it is provided with a plurality one-touch keys 5 and a name plate 6 for indicating the names of call sides (those which will call or be called to the user through a telephone line). The term "call side" in this specification means a called side (a receiver) when the user of this apparatus is a calling side (transmitter), and it means a calling side (transmitter) when the user of this apparatus is a called side (receiver). The call sides are registered in correspondence with the respective one-touch keys 5. In this embodiment, 16 one-touch keys are provided, and the names of the registered call sides are written on the name plate in correspondence with the respective one-touch keys 5 by user's hand-writing or other means.

It is well known that a one-touch dial registration is carried out by pushing a one-touch key, inputting the telephone number of a call side and then pushing a prescribed enter key. Through this operation, the telephone numbers of call sides are stored in a memory in correspondence with the respective one-touch keys 5.

Upon pushing a one-touch key 5, the telephone number of a call side which corresponds to the pushed one-touch key 5 is read out from the memory, and an automatic dialing is performed. That is, the dialing of the telephone number can be performed by merely pushing the one-touch key without full dialing. In this case, the telephone number of the call side is displayed on the display unit 4.

In this embodiment, the one-touch keys 5 and a name-writing area in-which the names are hand-written are provided. Therefore, in order to indicate (identify) a call side, LEDs (Light-Emitting Diodes) 7 are provided for the respective one-touch keys 5 in the vicinity of the name-writing area.

Upon pushing a one-touch key 5, the corresponding LED 7 is turned on, and the name of a call side can be confirmed by looking at the name plate 6. In addition, the telephone number of the call side is displayed on the display unit 4, and the call side can be further reconfirmed.

The above operation is substantially identical to that of a general telephone apparatus except for the LEDs 7 serving as the display device.

However, the telephone apparatus of this embodiment is different from the general telephone apparatus as follows. That is, when information on the telephone number of a calling side which is contained between first and second bell signals in transmitted modem data is detected at a call reception time, the information on the telephone number (telephone number data) is decoded. The decoded telephone number data is compared with the telephone number data which are stored in correspondence with the respective one-touch keys 5 in the memory. If there is any coincident telephone number data, the LED 7 located near to the one-touch key 5 for which the coincident telephone number is registered as a one-touch dial is turned on and off in accordance with the bell signals.

Accordingly, at the call reception time, when a calling side is one of call sides whose telephone numbers are registered in accordance with the one-touch keys, the name-writing area on the name plate is indicated by the LED 7. As a result, the user or called side can easily identify the name of the calling side on the basis of the name-writing area.

It is generally adopted for a conventional telephone apparatus that an user writes the names of call sides on a name plate for the one-touch registration, and thus in this embodiment no surplus and cumbersome operation for the Call Display is not required to the user. In addition, the name-writing on the name plate is performed by the user, and thus the user can write names other than subscribers registered in a telephone office.

That is, when a person who actually uses a telephone at a calling side is different from the subscriber of the telephone which is registered in a telephone office, the user can directly write the name of the person on the name plate. For example, when the name of a father is register as a subscriber, but his daughter actually uses the telephone of the subscriber to call the user with the telephone, it would be often confusing to display the name of the subscriber on a display unit utilizing the Name Display telephone service. However, according to this invention, the user can freely write the name of any person on the name plate, and the names of persons other than subscribers whom the user knows well can be indicated. These are very convenient for the user.

Next, the circuit construction of the telephone apparatus of the first embodiment according to this invention will be described with reference to FIGS. 3 through 6.

Figure 3:
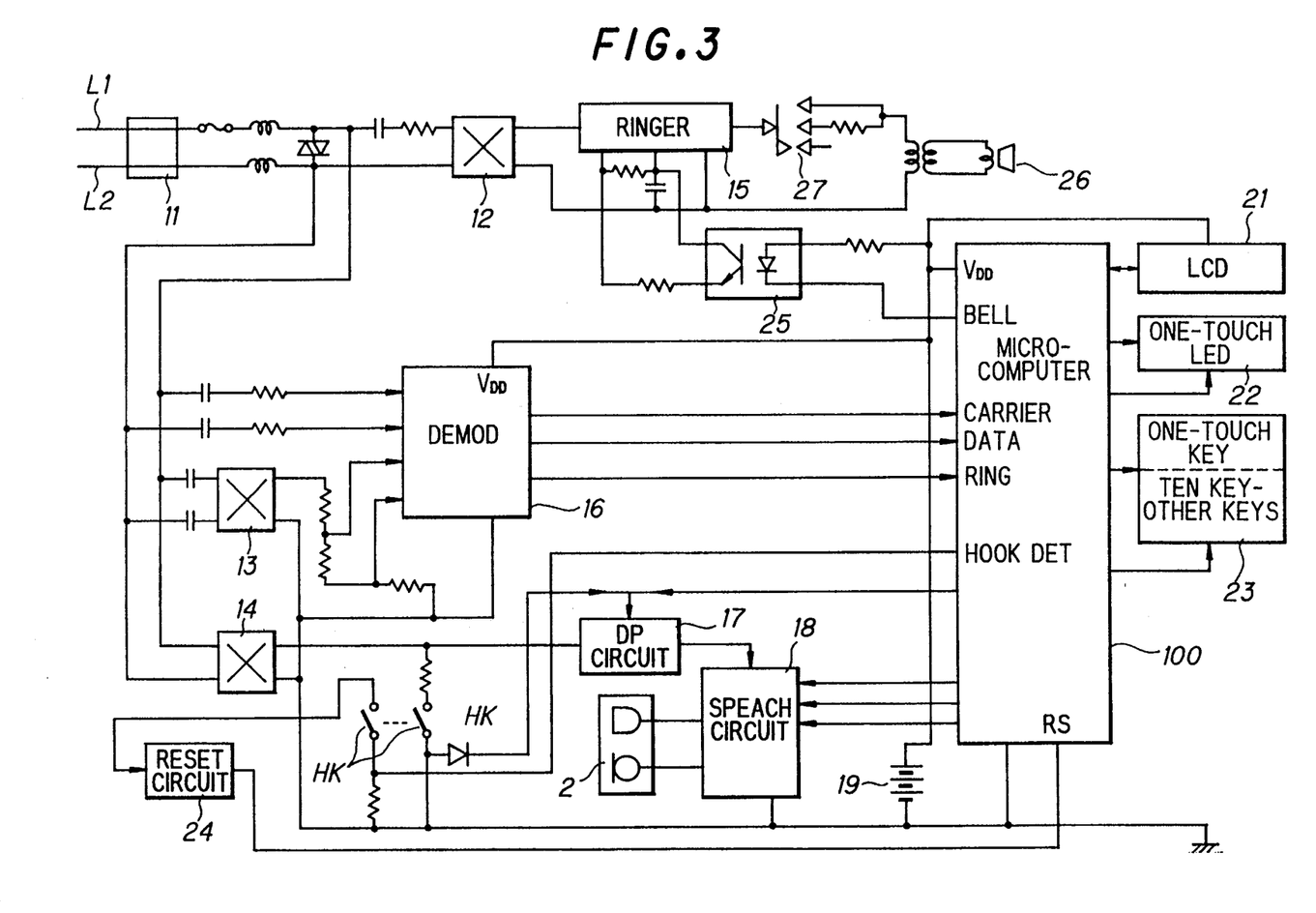
FIG. 3 is a circuit diagram of the first embodiment of the telephone apparatus according to this invention.

FIG. 3 is a circuit diagram showing the telephone apparatus, and this telephone apparatus is implemented by an IC technique.

In FIG. 3, L1 and L2 represent a telephone line, and are connected to a modular jack 11 provided for the telephone apparatus. Each of reference numerals 12, 13 and 14 represents a bridge circuit. Reference numeral 15 represents a ringer circuit composed of an integrated circuit (IC); reference numeral 16 denotes a demodulator composed of an IC; reference numeral 18 denotes a speech circuit composed of an IC; and reference numeral 19 denotes a DC power source.

Reference numeral 100 represents a microcomputer, and the microcomputer 100 is connected to the LCD display unit 4, a one-touch LED group 22 a plurality plural LEDs which are provided in correspondence with the respective one-touch keys 5 as shown in FIG. 2, and an operation key group 23 including the one-touch keys 5, the numeral key 3 and the other keys. The LED group 22 is designed in a matrix form.

In the embodiment as shown in FIG. 3, the microcomputer 100 is designed to be reset by a rest circuit 24 which is actuated in accordance with a hook switch HK. Reference numeral 25 represents a bell sound tone switching circuit for altering bell sound tone.

The microcomputer 100 includes a one-touch memory for storing telephone numbers which are registered in correspondence with the respective a plurality one-touch keys 5, and a telephone number for storing the telephone number of a calling side which is transmitted through the telephone lines L1 and L2. A work area of a so-called work RAM is usable for these memories.

At a time when reception bell signals arrive at the reception side through the telephone lines L1 and L2, the ringer circuit 15 is actuated to drive a bell 26 in accordance with the bell signals. Reference numeral 27 is a circuit for adjusting the sound volume of the bell, and in FIG. 3 the circuit 27 is switched to a state where no bell sound is produced.

When modem data are transmitted between first and second reception bell signals, the data are detected and demodulated by the demodulator 16. The demodulated data containing the telephone number information of the calling side are input to the microcomputer 100. The demodulator 16 also detects the reception bell signals, and supplies ring signals as a reception detection signal to the microcomputer 100.

The microcomputer 100 decodes the telephone number data, etc. from the demodulated output signal of the demodulator 16, and transmits the decoded output signal thereof to an LCD display circuit 21. Through this operation, the telephone number of the calling side, etc. are displayed on the display unit 4.

As described later, the microcomputer 100 also serves to successively compare the telephone number data obtained by decoding the demodulated output signal of the demodulator 16 with the telephone number data stored in the one-touch memory. If any coincident telephone number data is detected on the basis of the comparison result, the microcomputer 100 controls the driving of the one-touch LED group 22 so that the LED for the coincident telephone number is turned on and off. At the same time, if any coincident telephone number data exists, for the purpose of making the user aware by with sound, that the received call is made by an acquaintance which is registered for a one-touch key, the microcomputer 100 drives the sound tone switching circuit 25 and controls the ringer circuit 15 to alter the sound tone of reproduced sound of the bell 26. If no coincident telephone number data is detected, the telephone number data obtained by decoding the demodulated signal from the demodulator 16 are supplied to the LCD display circuit 21 to display the received telephone number on the display unit 4.

When the user picks up the hand set 2 in response to the call reception, the hook switch HK is turned on, and the microcomputer 100 detects the turn-on of the hook switch HK. The microcomputer 100 transmits a control signal to the speech circuit 18 to enable a telephonic communication with the calling side.

When the telephonic communication is finished and the hand set 2 is returned to the cradle state, the hook switch HK is turned off again, and the reset circuit 24 is actuated to reset the microcomputer 100 to its original state.

When a transmission is made by operating a one-touch key 5 or performing a dialing with the numeral key 3, the microcomputer 100 transmits a dial signal for the telephone number of a calling side to the circuits L1 and L2 through a dial pulse circuit 17.

Next, the operation of a main part of the first embodiment according to this invention will be described in more detail with reference to a block diagram of FIG. 4.

At the call reception time, the bell circuit 150 is actuated by the first bell signal, so that the bell 26 rings to produce normal bell sound. A reception and telephone number detecting circuit 160 containing the demodulator 16 and a part of the microcomputer 100 detects the call reception, and transmits a detection signal to the communication circuit 180. When modem data are transmitted between the first and second bell signals, the detecting circuit 160 demodulates the modem data, and decodes the telephone number data and other information. The decoded telephone number data is written into a telephone number memory 101 provided to the microcomputer 100.

At this time, in response to a reception and telephone number detection signal from the reception and telephone number detecting circuit 160, a read-out/write-in control circuit 102 is actuated to write the decoded telephone number data into the memory 101. Further, the read-out/write-in control circuit 102 reads out written telephone number data and transmits it to the LCD display circuit 21. The decoded telephone number data are displayed together with time information on the display unit 4. At the same time, the telephone number data read out from the memory 101 are supplied to a coincidence and comparison circuit 103.

On the other hand, the reception and telephone number detecting circuit 160 supplies the read-out/write-in control circuit 104 with a detection signal representing that the telephone number information is contained in the reception signal of the modem data. In response to the detection signal, the read-out/write-in control circuit 104 successively reads out from the one-touch memory 105 the telephone number data representing a plurality telephone numbers which were previously stored in the one-touch memory 105 while registered in correspondence with the respective one-touch keys, and transmits these data to the coincidence and comparison circuit 103.

A display control circuit 106 generates a driving signal for turning on and off the LEDs 7 which is located near to the one-touch key 5 registered for the coincidence telephone number. In response to the driving signal, one of the LEDs 7 for the corresponding one-touch key of the one-touch key group 22 is turned on and off in accordance with (in synchronism with) the bell signals.

The output signal of the coincidence and comparison circuit 103 is supplied to a sound tone switching circuit 250 including a part of the microcomputer 100 and the sound tone switching circuit 25. The sound tone switching circuit 250 receives the output signal of the circuit 103 to alter the sound tone of the second and subsequent bell signals toga sound tone which is different from that of the first bell signal, whereby an user or receiver is made aware that the call is made by a person who is registered for the one-touch key 5 next to the LED which is turned on and off.

In the one-touch memory 105 are successively stored telephone number data corresponding to the respective one-touch keys which have been registered by selection of the one-touch keys 5 and the numeral key 3 in the key group 23 containing the one-touch keys and the other keys by the one-touch registering circuit 107. At this time, the read-out/write-in control circuit 104 is controlled by the one-touch registering circuit 107 to perform the write-in operation of the telephone number data into the memory 105.

In response to the calling reception, the hand set 2 is lifted up and the hook switch HK is switched on in the communication circuit 180, so that a telephonic communication is allowed to be performed.

Figure 4:
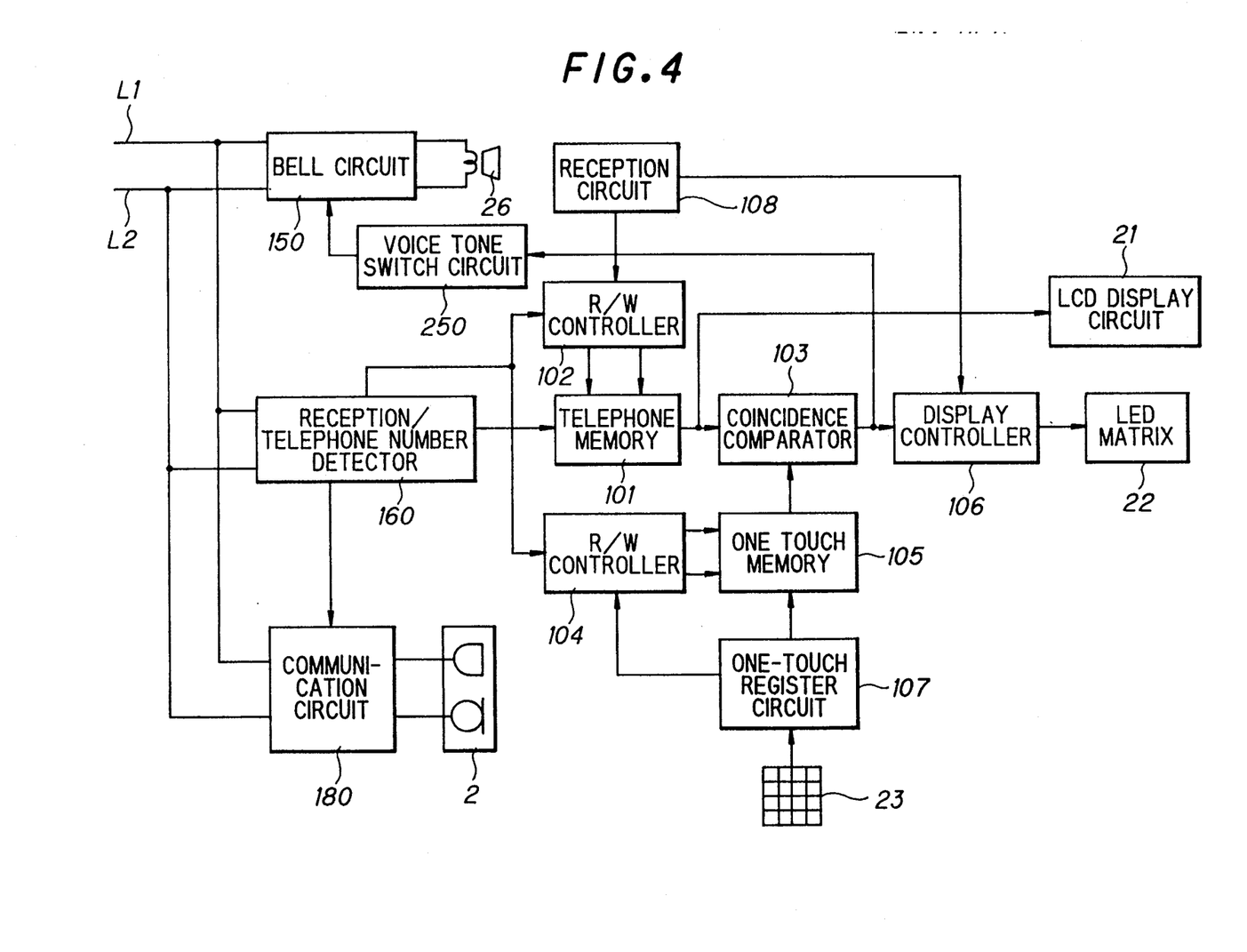
FIG. 4 is a block diagram showing the construction of a main part of the first embodiment of the telephone apparatus according to this invention.

The embodiment shown in FIG. 4 is designed so that several call events can be successively stored in the telephone number memory 101. That is, when a call has model data between bell signals, the read-out/write-in control circuit 102 receives the detection output signal of the detecting circuit 160, and successively writes telephone number data and time data of a permissible number of calls at serial addresses in the memory 101.

The user can search a plurality of received calls later with the reception review circuit 108, and the telephone apparatus is equipped with a key switch to perform the searching operation. Upon pushing the key switch for reception review, the reception review circuit 108 is actuated and the read-out/write-in control circuit 102 is driven to successively read out the stored telephone number data of calling sides. The telephone number data thus read out are successively transmitted to the LCD display circuit 21 to display the telephone numbers on the display unit 4.

At this time, like the call reception as described above, if the telephone number data of a searched received call is coincident with one of the telephone number data which have been registered as one-touch dials, the LED 7 in the vicinity of the corresponding one-touch key 5 is turned on, whereby the user can identify the name of the searched received call from the name plate 6. This reception review utilizes the fact that the telephone number data are stored in the telephone number memory 10 even when no answering to a call is made in an automatically answering mode, for example. Accordingly, it is effective in a case where a call is made later at the reception side to answer the received calls (hereinafter referred to as a "re-call").

That is, when calls from calling sides which have been received and registered in correspondence with the respective one-touch keys are checked on the plate name through the display of the LED by actuating the reception review circuit 108, the user can make an automatic dial call to each of the calling sides by pushing each of, the one-touch keys that has a corresponding lit LED.

In a conventional reception review circuit 108, when a re-call is required to be made with looking at the display unit, the telephone number to be re-called can be automatically dialed by pushing a send key. However, even when the user sees the telephone number, he often does not know the name of the calling side of the call. On the other hand, in this embodiment the user can easily determine know the name of the calling side by seeing the name plate. For example, when a calling side is an user's acquaintance who is registered for a one-touch,key 5 and the user wants to re-call the acquaintance, the user can easily check the name of the acquaintance with the name-writing area of the name plate in the vicinity of the turned-on LED 7. In this case, the re-call can be made pushing not only the one-touch key 5, but also the send key.

Figure 5:
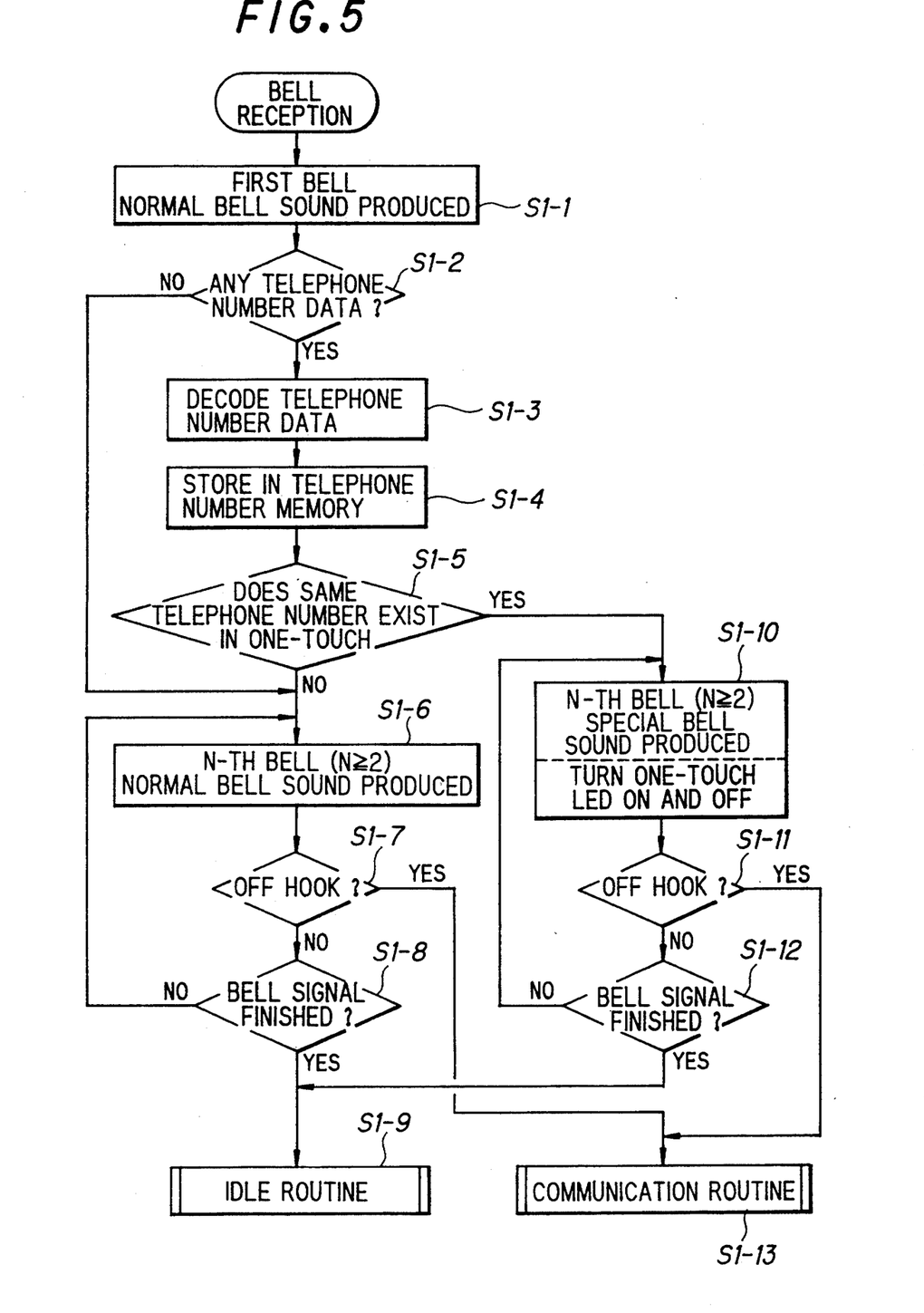
FIG. 5 is a flowchart for the main part of the first embodiment of this invention.

FIG. 5 is a flowchart showing the operation of the microcomputer 100 at the call reception time.

When a call is received, a first bell sound is produced as a normal sound by ringing the bell 26 (step S1-1). Subsequently, the program goes to a step S1-2 to judge on the basis of demodulated data from the demodulator 16 whether telephone number data are transmitted between first and second bell signals. If the telephone number data are judged to be transmitted, the program goes from the step S1-2 to a step S1-3, at which the microcomputer 100 decodes the demodulated data.

Subsequently, the decoded telephone number data are stored in the telephone number data at a step S1-4.

Next, the program goes to a step S1-5 to judge whether the same telephone number data as the received telephone number stored in the memory 101 exists in the telephone number data stored in the one-touch memory 105. If no same telephone number data exists, the program goes from the step S1-5 to a step S1-6 to produce normal bell sound in response to the second and subsequent bell signals by ringing the bell 26.

At a next step S1-7, the hand set is lifted up and it is determined whether the hand set is the off-hook is performed. If it is determined at step S1-8 that the bell signals are finished in a state where the hand set is not off-hook, the program goes to a step S1-9 at which the microcomputer 100 is shifted to a routine for a stand-by state or idle state. If it is determined at the step S1-8 that the bell signals are not finished, the program returns to the step S1-6 to continue ringing the bell as normal sound.

If it is detected at step S1-7 that the hand set is off-hook, the program goes to a step S1-13 at which the microcomputer 100 is shifted to a telephonic communication routine. If no telephone number data are detected at the steps S1-2, the program jumps to the step S1-6 to carry out the above step.

If it is judged at the step S1-5 that any coincident telephone number data exists between the telephone number data registered in the one-touch memory 105 and the received telephone number data, the program goes from step S1-5 to the step S1-10, at which the sound tone switching circuit 25 is controlled to alter the sound tone of the second and subsequent bell signals. At the same time, the LED 7 located near to the one-touch key 5 corresponding to the telephone number data in the one-touch memory 105, which is coincident with the detected telephone number data, is turned on and off in accordance with the bell sound. The user can therefore identify the calling side from the name-writing area of the name plate by seeing the blinking of the LED 7.

Subsequent to the step S1-10, the program goes to a step S1-11, at which a call reception is made and it is determined whether the hand set is off-hook. If it is determined that the hand set is off-hook, the program goes from the step S1-11 to a step S1-13 to start the telephonic communication routine.

If it is determined at the step S1-11 that the off-hook is not the program goes to a step S1-12 to determine whether the bell signals are finished. If the bell signals are not finished, the program returns to the step S1-10 to continue the bell sound having its sound tone altered and continue to blink the LED 7. If it is judged at the step S1-12 that the bell signals are finished, the program goes to the step S1-9 to shift to the idle routine.

Figure 6:
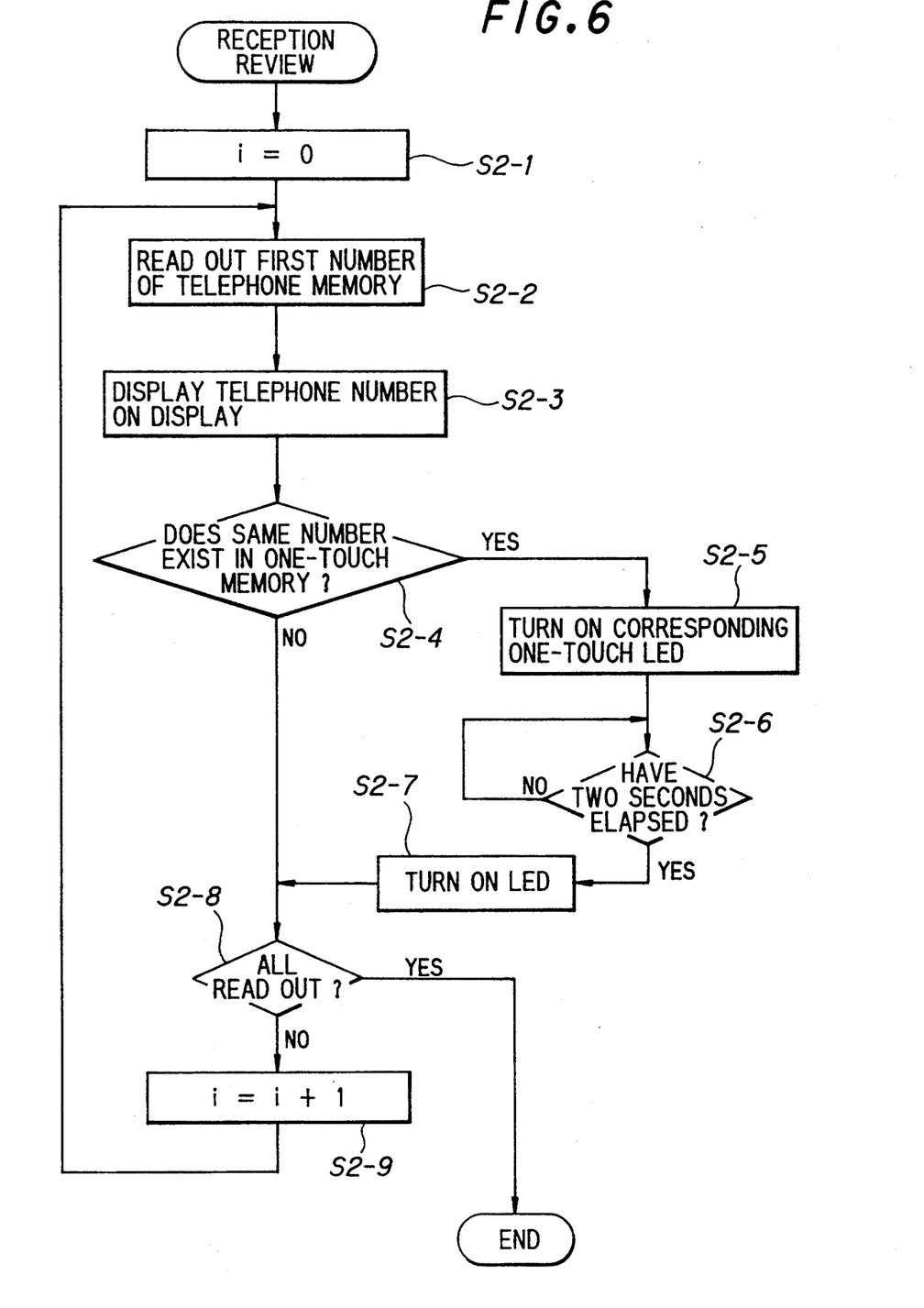
FIG. 6 is another flowchart for the main part of the first embodiment of this invention.

Next, the flowchart for the reception review will be described with reference to FIG. 6.

When a reception review key (not shown) is pushed, this routine is started. At a step S2-1, the address of the telephone number memory 101 is initialized to a head one. Subsequently, the program goes to a step S2-2 to read out telephone number data registered at a first address of the memory 101. Thereafter, the program goes to a step S2-3 to display the read-out telephone number data on the display unit 4.

The program further goes to a step S2-4 to compare the read-out telephone number data with the telephone number data stored in the one-touch memory 105 and determine whether the same telephone number data exists in the telephone number data of the one-touch dials. If the same telephone number exists, the program goes from the step S2-4 to a step S2-5 to turn on the LED 7 for the one-touch key 5 for which the telephone number data is registered.

Subsequently, it is determined at a step S2-6 whether the turn-on state of the LED 7 has been continued for two seconds, for example. If two seconds elapse, the program goes to a step S2-7 to turn off the LED 7, and then goes to a step S2-8. If it is determined at the step S2-4 that no same telephone number exists in the one-touch memory 105, the program goes from the step S2-4 to the step S2-8.

At the step S2-8, it is determined whether all stored telephone number data have been read out from the telephone number memory 101. If all the telephone number data have not yet been read out, a next address is indicated at a step S2-9, and then the program returns to the step S2-2 to repeat the same operation as described above. If it is determined at the step S2-8 that all the telephone number data have been read out, the reception review routine is ended.

In the above embodiment, when the same telephone number data as a calling side is registered in correspondence with the one-touch key, the LED 7 near to the name plate 6 is turned out, whereby the user can identify the calling side. Alternatively, a variation may be used where the LEDs 7 are provided inside of the respective one-touch keys 5 and an operation unit of each one-touch key 5 is illuminated from the back side thereof to enable the user to identify a calling side. Likewise, another variation may be used where the LEDs are provided at the back side of the name plate, and the name plate is illuminated to enable the user to identify a calling side. Further, another variation may be adopted where the LEDs are provided inside of the respective one-touch keys, and the key itself is lighted.

In addition to or in place of a manner that a calling side is identified by turning on or turning off one of the LEDs 7 for indication, the name of a calling side may be sounded with voice.

Figure 7:
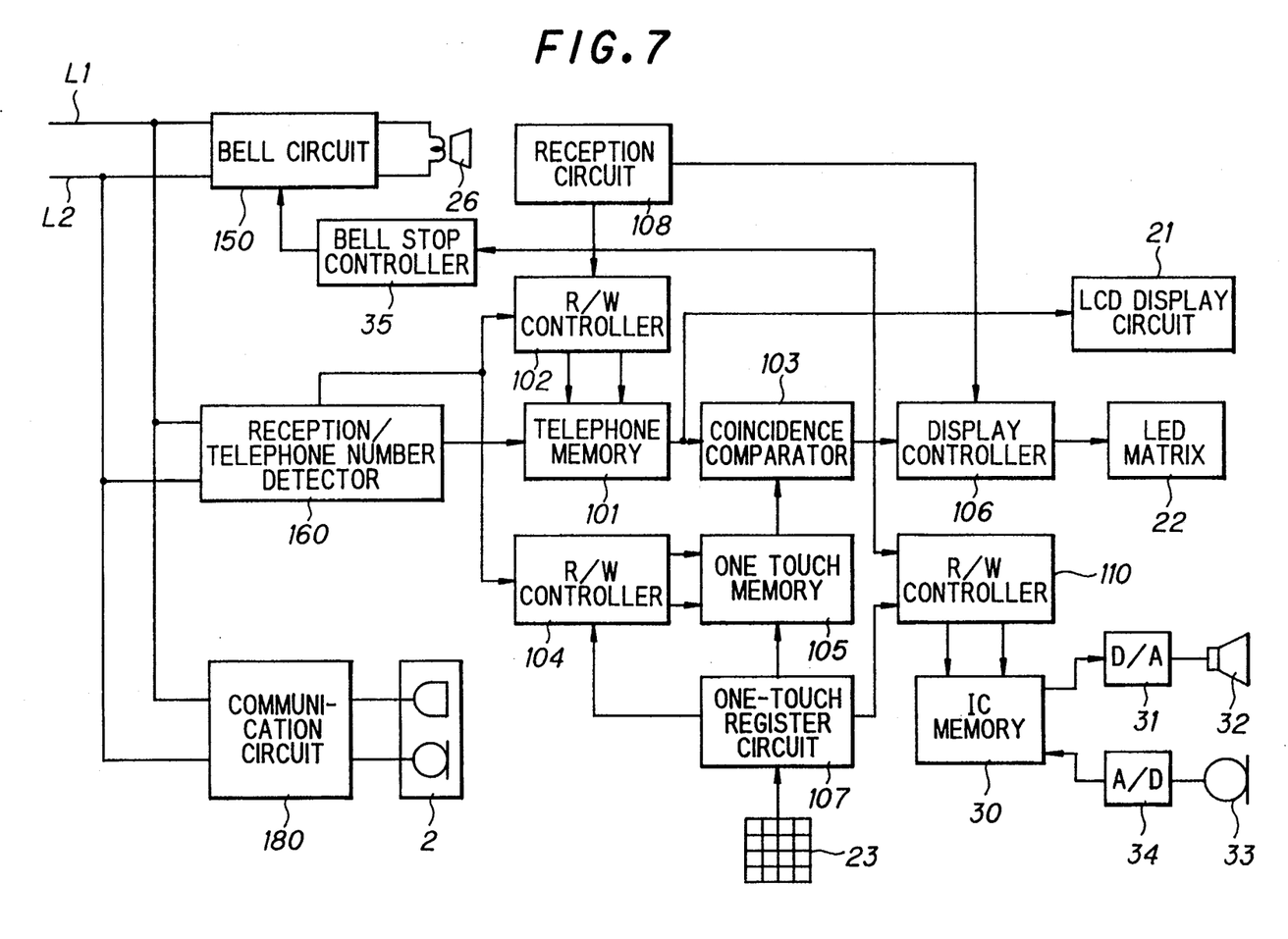
FIG. 7 is a block diagram of a second embodiment of the telephone apparatus according to this invention.

FIG. 7 is a block diagram showing a second embodiment of the telephone apparatus according to the present invention in which the name of a call side is sounded with voice in addition to the display of the LED 7. The same elements as the first embodiment are represented by the same reference numerals, and the detailed description thereof is omitted.

The second embodiment is additionally provided with a audio memory 30. When telephone number data are registered by the one-touch keys 5, the names of calling sides corresponding telephone number data are registered as audio data. This operation is performed by pushing the one-touch keys 5 to input the telephone number data, and at the same time by inputting the names of the call sides with voice using a microphone unit 33. The output signal of the microphone unit 33 is converted to digital signals by an A/D converter 34, and stored into the audio memory 30.

The read-out/write-in control circuit 110 is used to control the audio memory 30. The control circuit 110 is controlled to set the audio memory 30 to a data-writable state at the same time as the telephone number data are registered into the one-touch memory 105 by the one-touch registering circuit 102, whereby the audio data of the names of the call sides can be performed by the user.

At the call reception time, the telephone number data are detected and decoded. If the received telephone number data is coincident with one of the telephone number data registered in the one-touch memory 105, the read-out/write-in control circuit 10 is actuated. The audio memory 30 is set to a data read-out state by the control circuit 110, and the audio data of the name of a call side which is registered in correspondence with the coincident telephone number data. The read-out audio data are supplied through a D/A converter 31 to a speaker unit 32 to reproduce the name of the call side with voice.

At this time, the second and subsequent bell sounds are stopped to enable the user to easily hear the sound from the speaker unit 32. In order to perform this operation, the output signal of the coincidence and comparison circuit 103 is supplied to a bell stop control circuit, whereby the bell stop control circuit is controlled to stop the bell sound of the bell circuit, etc.

Figure 8:
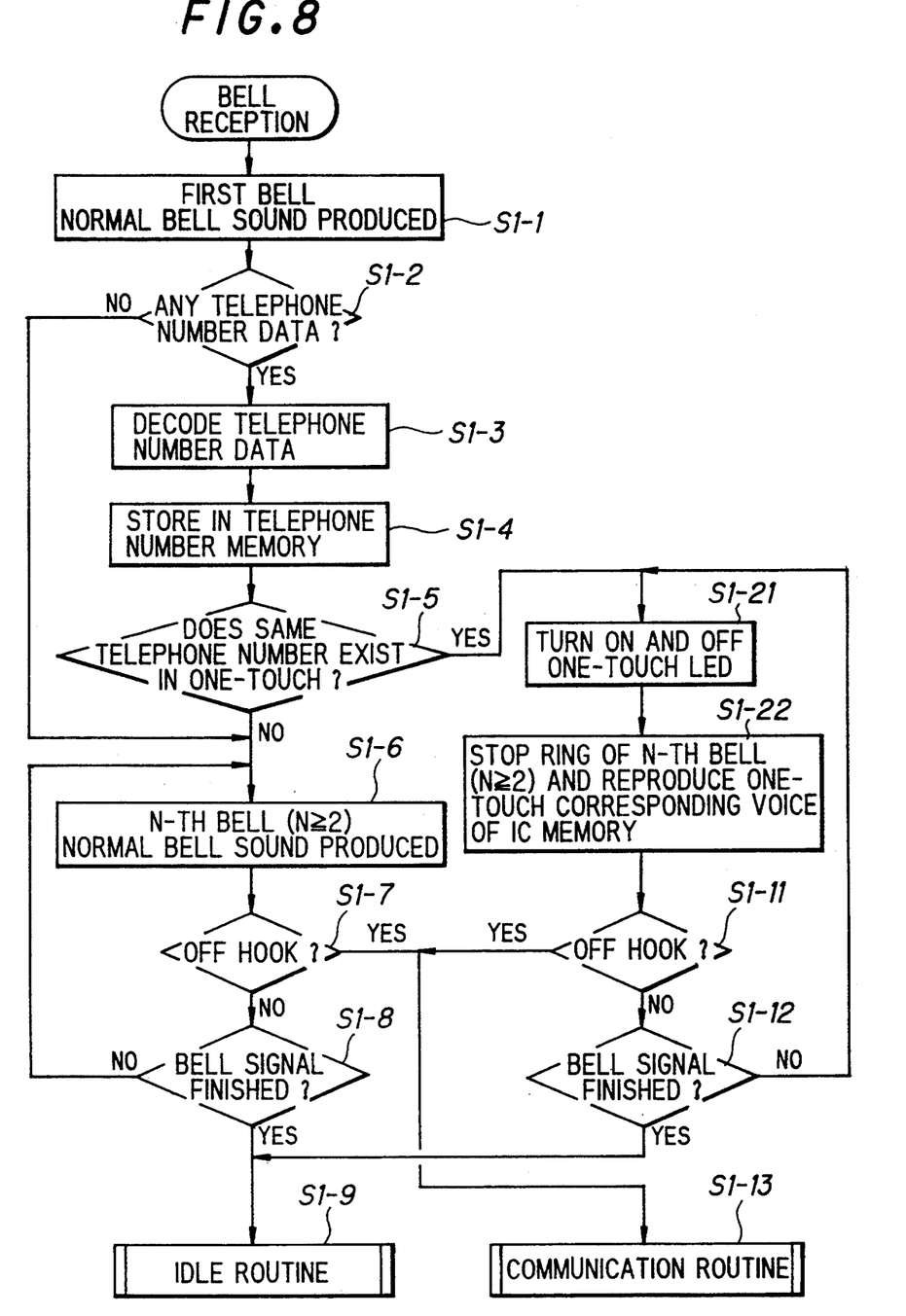
FIG. 8 is a flowchart for the operation of the embodiment of FIG. 7.

FIG. 8 is a flowchart for the second embodiment when the name of a call side is sounded with voice. In this embodiment, steps S1-21 and 22 are substituted for the step S1-10 of the flowchart shown in FIG. 5. The other steps are similar to those of FIG. 5.

That is, in the second embodiment, when the telephone number data stored in the one-touch memory 105 contains telephone number data which is coincident with the received telephone number data, the program jumps from the step S1-5 to the step S1-21 to turn on and off the LED 7 near to the one-touch key 5 for the coincident telephone number. Thereafter, the program goes to the step S1-22 to stop the second and subsequent ringing operations (bell sound) of the bell, and then to read out the audio data for the name of the call side corresponding to the one-touch key and reproduce the data by the speaker unit 32. The program goes from the step S1-22 to the step S1-11.

For example, a voice like "CALL FROM JOHN . . . CALL FROM JOHN . . ." is announced from the speaker unit 32. Through this voice, the user can identify the calling side without looking at the display panel screen of the telephone apparatus by the voice from the speaker unit 32.

The microphone unit 33 and the speaker unit 32 which serve as audio input means for registering the audio data such as voice into the audio memory may be arranged in the same way as a microphone 8 and a speaker 9 shown in FIG. 2. This arrangement is an example, and other arrangements may be adopted.

An alternative arrangement may be used to enable the user to identify a calling side of telephone number data which is registered as a one-touch dial wherein voice is be used without the LED 7.

What is claimed is:

1. A telephone apparatus comprising:
   decode means for detecting telephone number information of a calling side transmitted together with bell signals through a telephone line and decoding the detected telephone number information to output telephone number data;
   memory means for storing telephone number data of a plurality of calling sides in correspondence with a plurality of respective operation keys;
   comparison means for comparing the telephone number data stored in said memory means with the output telephone number data of said decode means when a call is received and the telephone number information of the calling side is detected; and
   output means for indicating to a user that the received call corresponds to one of the telephone number data of calling sides already stored in said memory means when a comparison result of said comparison means represents coincidence between the output telephone number data of said decode means and one of the telephone number data stored in said memory means,
   wherein said output means comprises a plurality of indication units each of which is provided in correspondence with each of said plurality of respective operation keys, and driving control means for selectively driving one of said plurality of indication units on the basis of the comparison result.

2. A telephone apparatus according to claim 1, said apparatus further comprising a name-writing area for a user of the telephone apparatus to write the names of the calling sides whose telephone number data have been stored in said memory means in correspondence with said plurality of respective operation keys.

3. A telephone apparatus according to claim 1, said apparatus further comprising a name-writing area for a user of the telephone apparatus to write the names of the calling sides whose telephone number data have been stored in said memory means in correspondence with said plurality of respective operation keys, and wherein said output means further comprises illumination means for illuminating name-written portions written in said name-writing area from a back side thereof, and control means for controlling said illumination means for selectively illuminating a name-written portion corresponding to coincident telephone number data on the basis of the comparison result.

4. A telephone apparatus according to claim 1, wherein said output means further comprises an audio data memory for storing names corresponding to the telephone number data stored in said memory means as audio data, electro-acoustic transducing means to which the audio data are supplied from said audio data memory, and control means for controlling said electro-acoustic transducing means for reading out the audio data corresponding to the coincident telephone number data from said audio data memory on the basis of the comparison result, and outputting a voice representing the name corresponding to the coincident telephone number data.

5. A telephone apparatus according to claim 4, said apparatus further comprising bell stop means for stopping a bell sounding on the basis of the comparison result.

6. A telephone apparatus according to claim 1, wherein said output means further comprises sound tone switching means for altering the sound tone of a bell, and control means for controlling said sound tone switching means to alter the bell sound tone to a sound tone different from a normal sound on the basis of the comparison result.

7. A telephone apparatus comprising:
   decode means for detecting telephone number information of a calling side transmitted through a telephone line and decoding the detected telephone number information to output telephone number data;
   memory means for storing telephone number data of a plurality of calling sides in correspondence with a plurality of respective operation keys;
   a name-writing area for a user of the telephone apparatus to write names of calling sides corresponding to the telephone number data stored in said memory means in correspondence with said plurality of respective operation keys;

indication means for indicating each name-written portion of said name-writing area;

comparison means for comparing the telephone number data stored in said memory means with output telephone number data of said decode means when a call is received and the telephone number information of the calling side is detected; and driving circuit means for driving said indication means so that when said comparison means detects coincidence between the telephone number data decoded by said decode means and one of the telephone number data stored in said memory means, a name-written portion of the calling side which corresponds to the detected coincident telephone number data in the name-writing area is indicated.

8. A telephone apparatus according to claim 7, wherein said indication means comprises light emitting elements provided adjacent to name-written portions each of which is written in correspondence with each of said plurality of respective operation keys.

9. A telephone apparatus according to claim 7, wherein said indication means is designed so that when any coincident telephone number data is detected by said comparison means, said indication means indicates an operation portion of one of said plurality of respective operation keys corresponding to the detected coincident telephone number data.

10. A telephone apparatus according to claim 7, wherein said indication means comprises illumination means for individually illuminating each of name-written portions of said name-writing area from a back side thereof, said name-written portions being written in correspondence with each of said plurality of respective operation keys, and when any coincident telephone number data is detected by said comparison means, said illumination means illuminates the name-written portion corresponding to the detected coincident telephone number data.

11. A telephone apparatus comprising:

decode means for detecting telephone number information of a calling side transmitted through a telephone line and decoding the detected telephone number information to output telephone number data;

memory means for storing telephone number data of a plurality of calling sides in correspondence with a plurality of respective operation keys;

recording and reproducing means for recording and reproducing as audio data names of calling sides corresponding to the telephone number data stored in said memory means in correspondence with each of said plurality of respective operation keys;

a speaker unit to which the audio data outputted from said recording and reproducing means are supplied;

comparison means for comparing the telephone number data stored in said memory means with output telephone number data of said decode means when a call is received and the telephone number information of the calling side is detected;

control means for controlling said recording and reproducing means so that when said comparison means detects any coincidence between the telephone number data stored in said memory means and the telephone number data decoded by said decode means, the name of the calling side corresponding to the coincidence-detected telephone number data is reproduced and output to said speaker unit;

a name-writing area for a user of the telephone apparatus to write names of calling sides corresponding to the telephone number data stored in said memory means in correspondence with each of said plurality of respective operation keys;

indicating means for indicating each name-written portion of the calling sides which are written in said name-writing area; and driving means for driving said indicating means so that when said comparison means detects any coincidence between the telephone number data stored in said memory means and the telephone number data decoded by said decode means, the name of the calling side corresponding to the coincidence-detected telephone number data is indicated, wherein said indication means is designed to indicate each of operation portions of said plurality of respective operation keys so that when said comparison means detects the same telephone number data, the operation portion of one of said plurality of respective operation keys corresponding to the detected telephone number data is indicated.

12. A telephone apparatus according to claim 11, wherein said indication means comprises illumination means for individually illuminating each of the name-written portions written in said name-writing area in correspondence with said plurality of respective operation keys from a back side thereof, and when said comparison means detects the same telephone number data, the name-written portion corresponding to the detected telephone number data is illuminated by said illumination means.

13. A telephone apparatus according to claim 11, said apparatus further comprising bell stop means for stopping bell sound on the basis of the comparison result.

14. A telephone apparatus comprising:

decode means for detecting telephone number information of a calling side transmitted together with bell signals through a telephone line and decoding the detected telephone number information to output telephone number data;

first memory means for storing the telephone number data decoded by said decode means;

second memory means for storing telephone number data of a plurality of calling sides in correspondence with a plurality of respective operation keys;

a name-writing area for a user of the telephone apparatus to write names of the calling sides corresponding to the telephone number data stored in said second memory means in correspondence with ones of said plurality of respective operation keys;

indicating means for indicating each of name-written portions of the calling sides written in said name-writing area;

a comparison and coincidence circuit for reading out the telephone number data from said first memory means and the telephone number data from said second memory means and comparing these telephone number data to detect whether any coincident telephone number data exists between these data when receiving a search instruction; and driving means for controlling said indicating means so that when said comparison and coincidence circuit detects coincident telephone number data, a name-written portion of a calling side which corresponds to the detected coincident telephone number data is indicated by the indicating means.

15. A telephone apparatus comprising:

decode means for detecting telephone number information of a calling side transmitted together with bell signals through a telephone line and decoding the detected telephone number information to output telephone number data;

memory means for storing telephone number data of a plurality of calling sides in correspondence with a plurality of respective operation keys;

a plurality of indication units provided in correspondence with said plurality of respective operation keys;

comparison means for comparing the telephone number data stored in said memory means with the output telephone number data of said decode means when a call is received and the telephone number information of the calling side is detected; and control means for selectively driving said plurality of indication units so that when the comparison result of said comparison means represents that the output telephone number data of said decode means is coincident with one of the telephone number data stored in said memory means, one of said plurality of indication units corresponding to a respective one of said plurality of operation keys corresponding to the coincident telephone number data is selectively driven.

16. A telephone apparatus according to claim 15, said apparatus further comprising a name-writing area for a user of the telephone apparatus to write names of calling sides corresponding to the telephone number data stored in said memory means in correspondence with each of said plurality of respective operation keys, and wherein each of said plurality of indication units is provided in correspondence with each of the names which are written in the name-writing area.

17. A telephone apparatus according to claim 15, said apparatus further comprising sound tone switching means for altering a sound tone of a bell, and wherein said control means controls said sound tone switching means on the basis of the comparison result to alter the sound tone to a sound tone different from that at a normal call reception time.

18. A telephone apparatus comprising:

decode means for detecting telephone number information of a calling side which is transmitted together with bell signals through a telephone line and decoding the detected telephone number information to output telephone number data;

memory means for storing telephone number data of a plurality of calling sides in correspondence with a plurality of respective operation keys;

a plurality of first display units which are provided in correspondence with said plurality of respective operation keys;

a second display unit for displaying the data decoded by said decode means;

comparison means for comparing the telephone number data stored in said memory means with the output telephone number data of said decode means when a call is received and the telephone number information of the calling side is detected; and control means for controlling said first and second display units so that when the comparison result of said comparison means represents that the output telephone number data of said decode means is coincident with one of the telephone number data stored in said memory means, one of said first display units corresponding to one of said plurality of respective operation keys for the coincident telephone number data is selectively driven, and when the comparison result represents that no coincident telephone number data exists, the telephone number data of the calling side which is decoded by said decode means are displayed on said second display unit.

19. A telephone apparatus according to claim 18, said apparatus further comprising a name-writing area for a user of the telephone apparatus to write names of calling sides corresponding to the telephone number data stored in said memory means in correspondence with said plurality of respective operation keys, and wherein said first display units are respectively provided in correspondence with the plurality of names written in said name-writing area.

* * * * *